US011831610B2

(12) United States Patent
Kulkarni et al.

(10) Patent No.: US 11,831,610 B2
(45) Date of Patent: Nov. 28, 2023

(54) SYSTEM AND METHOD FOR USING PRIVATE NATIVE SECURITY GROUPS AND PRIVATE NATIVE FIREWALL POLICY RULES IN A PUBLIC CLOUD

(71) Applicant: VMWARE, INC., Palo Alto, CA (US)

(72) Inventors: Vaibhav Kulkarni, Pune (IN); Ganesan Chandrashekhar, Palo Alto, CA (US); Mukesh Hira, Palo Alto, CA (US); Akshay Katrekar, Palo Alto, CA (US); Prashant Mane, Palo Alto, CA (US); Rompicherla Sai Pavan Kumar, Pune (IN); Sachin Kalkur, Bangalore (IN); Amey Borkar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 555 days.

(21) Appl. No.: 16/938,989

(22) Filed: Jul. 26, 2020

(65) Prior Publication Data
US 2021/0385194 A1 Dec. 9, 2021

(30) Foreign Application Priority Data
Jun. 4, 2020 (IN) .............................. 202041023556

(51) Int. Cl.
*H04L 9/40* (2022.01)
*G06F 9/455* (2018.01)

(52) U.S. Cl.
CPC ...... *H04L 63/0263* (2013.01); *G06F 9/45558* (2013.01); *H04L 63/104* (2013.01); *G06F 2009/45587* (2013.01); *G06F 2009/45595* (2013.01)

(58) Field of Classification Search
CPC .............. H04L 63/0263; H04L 63/104; G06F 9/45558; G06F 2009/45587; G06F 2009/45595
See application file for complete search history.

(56) References Cited

U.S. PATENT DOCUMENTS

| 11,240,203 | B1* | 2/2022 | Eyada | .................. H04L 63/0263 |
| 2015/0295731 | A1* | 10/2015 | Bagepalli | ............ H04L 12/6418 |
| | | | | 370/401 |
| 2020/0021594 | A1* | 1/2020 | Arregoces | ............. H04L 63/102 |
| 2020/0235990 | A1* | 7/2020 | Janakiraman | ........... H04L 45/44 |
| 2020/0244702 | A1* | 7/2020 | Ambardekar | ....... H04L 63/0263 |
| 2021/0075767 | A1* | 3/2021 | Jain | ..................... H04L 63/0263 |

* cited by examiner

*Primary Examiner* — Bruce S Ashley
(74) *Attorney, Agent, or Firm* — LOZA & LOZA, LLP

(57) ABSTRACT

A system and method for using private native security groups and private native firewall policy rules for a private cloud computing environment and a public cloud computing environment uses a public cloud gateway for routing data traffic between at least a cloud network created in the public cloud computing environment and the private cloud computing environment. For each of some private native firewall policy rules that has any of newly created private native security groups as one of source and destination, a cloud native security group (CNSG) rule object with an CNSG outbound rule object and an CNSG inbound rule object for the public cloud is created and at least one of the CNSG outbound rule object and the CNSG inbound rule object is updated so that the private native firewall policy rule can be used in the cloud network.

20 Claims, 12 Drawing Sheets

SYSTEM AND METHOD FOR USING PRIVATE NATIVE SECURITY GROUPS AND PRIVATE NATIVE FIREWALL POLICY RULES IN A PUBLIC CLOUD

RELATED APPLICATIONS

Benefit is claimed under 35 U.S.C. 119(a)-(d) to Foreign Application Serial No. 202041023556 filed in India entitled "SYSTEM AND METHOD FOR USING PRIVATE NATIVE SECURITY GROUPS AND PRIVATE NATIVE FIREWALL POLICY RULES IN A PUBLIC CLOUD", on Jun. 4, 2020, by VMware, Inc., which is herein incorporated in its entirety by reference for all purposes.

BACKGROUND

Cloud architectures can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

With increasing adaptation of cloud computing and cloud storage by enterprises, enterprise information technology (IT) solutions for operations and automation are increasingly delivered as SaaS, with abilities to function across public clouds and on-premises. However, some cloud solutions may require agents to be installed in all the workload virtual machines (VMs) to get the benefits of a private cloud capabilities in a public cloud. But installation of agents sometimes becomes bottleneck in deploying the solution.

In general, users of cloud solutions want a common policy across public clouds and on-premises without agents for various reasons. Some of these reasons include, but not limited to, 1) lifecycle management of agent is cumbersome, 2) on-premises administrator may not have control over cloud providers to mandate agent deployment, and 3) some users may consider adding an agent as violation of compliance requirement.

SUMMARY

A system and method for using private native security groups and private native firewall policy rules for a private cloud computing environment and a public cloud computing environment uses a public cloud gateway for routing data traffic between at least a cloud network created in the public cloud computing environment and the private cloud computing environment. For each of some private native firewall policy rules that has any of newly created private native security groups as one of source and destination, a cloud native security group (CNSG) rule object with an CNSG outbound rule object and an CNSG inbound rule object for the public cloud is created and at least one of the CNSG outbound rule object and the CNSG inbound rule object is updated so that the private native firewall policy rule can be used in the cloud network.

A computer-implemented method for using private native security groups and private native firewall policy rules for a private cloud computing environment and a public cloud computing environment in accordance with an embodiment of the invention comprises creating a cloud network in the public cloud computing environment, the cloud network including a public cloud gateway for routing data traffic between at least the cloud network and the private cloud computing environment, creating new private native security groups (PNSGs) in response to user input, and for each of some private native firewall policy rules that has any of the new private native security groups as one of source and destination: creating a cloud native security group (CNSG) rule object with an CNSG outbound rule object and an CNSG inbound rule object for the public cloud computing environment that corresponds to a private native firewall policy rule, and updating at least one of the CNSG outbound rule object and the CNSG inbound rule object so that the private native firewall policy rule can be used in the cloud network. In some embodiments, the steps of this method are performed when program instructions contained in a non-transitory computer-readable storage medium are executed by one or more processors.

A system for using private native security groups and private native firewall policy rules for a private cloud computing environment and a public cloud computing environment in accordance with an embodiment of the invention comprises memory, and at least one processor configured to: create a cloud network in the public cloud computing environment, the cloud network including a public cloud gateway for routing data traffic between at least the cloud network and the private cloud computing environment, create new private native security groups (PNSGs) in response to user input, and for each of some private native firewall policy rules that has any of the new private native security groups as one of source and destination: create a cloud native security group (CNSG) rule object with an CNSG outbound rule object and an CNSG inbound rule object for the public cloud computing environment that corresponds to a private native firewall policy rule, and update at least one of the CNSG outbound rule object and the CNSG inbound rule object so that the private native firewall policy rule can be used in the cloud network.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
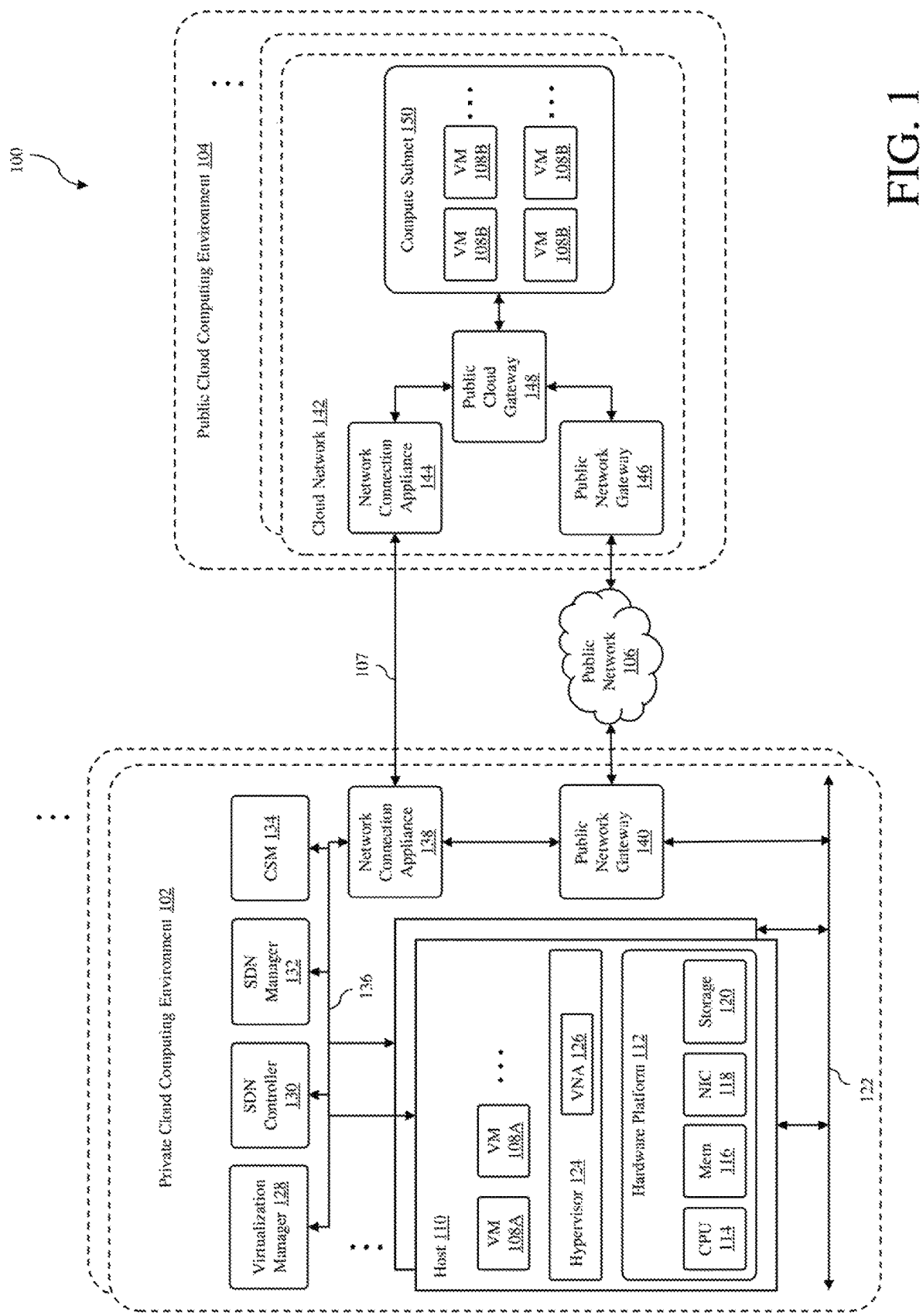
FIG. 1 is a block diagram of a hybrid cloud system in accordance with an embodiment of the invention.

Turning now to FIG. 1, a block diagram of a hybrid cloud system 100 in accordance with an embodiment of the invention is shown. The hybrid cloud system includes at least one private cloud computing environment 102 and at least one public cloud computing environment 104 that may be connected via a network 106 or a direction connection 107. The hybrid cloud system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders or tenants, such as the particular enterprise in addition to other enterprises. In some embodiments, the private cloud computing environment may comprise one or more on-premise data centers.

The private and public cloud computing environments 102 and 104 of the hybrid cloud system 100 include computing and/or storage infrastructures to support a number of virtual computing instances 108A and 108B. As used herein, the term "virtual computing instance" refers to any software entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being VMs, although embodiments of the invention described herein are not limited to VMs.

As shown in FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, memory 116, a network interface 118, and storage 120. The processor 114 can be any type of a processor, such as a central processing unit. The memory 116 is volatile memory used for retrieving programs and processing data. The memory 116 may include, for example, one or more random access memory (RAM) modules. The network interface 118 enables the host 110 to communicate with another device via a communication medium, such as a physical network 122 within the private cloud computing environment 102. The physical network 122 may include physical hubs, physical switches and/or physical routers that interconnect the hosts 110 and other components in the private cloud computing environment 102. The network interface 118 may be one or more network adapters, such as a Network Interface Card (NIC). The storage 120 represents local storage devices (e.g., one or more hard disks, flash memory modules, solid state disks and optical disks) and/or a storage interface that enables the host 110 to communicate with one or more network data storage systems. Example of a storage interface is a host bus adapter (HBA) that couples the host 110 to one or more storage arrays, such as a storage area network (SAN) or a network-attached storage (NAS), as well as other network data storage systems. The storage 120 is used to store information, such as executable instructions, virtual disks, configurations and other data, which can be retrieved by the host 110.

Each host 110 may be configured to provide a virtualization layer that abstracts processor, memory, storage and networking resources of the hardware platform 112 into the virtual computing instances, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host 110 may include other virtualization software platforms to support those processing entities, such as Docker virtualization platform to support software containers. In the illustrated embodiment, the host 110 also includes a virtual network agent 126. The virtual network agent 126 operates with the hypervisor 124 to provide virtual networking capabilities, such as bridging, L3 routing, L2 Switching and firewall capabilities, so that software defined networks or virtual networks can be created. The virtual network agent 126 may be part of a VMware NSX® logical network product installed in the host 110 ("VMware NSX" is a trademark of VMware, Inc.). In a particular implementation, the virtual network agent 126 may be a virtual extensible local area network (VXLAN) endpoint device (VTEP) that operates to execute operations with respect to encapsulation and decapsulation of packets to support a VXLAN backed overlay network.

The private cloud computing environment 102 includes a virtualization manager 128, a software-defined network (SDN) controller 130, an SDN manager 132, and a cloud service manager (CSM) 134 that communicate with the hosts 110 via a management network 136. In an embodiment, these management components are implemented as computer programs that reside and execute in one or more computer systems, such as the hosts 110, or in one or more virtual computing instances, such as the VMs 108A running on the hosts.

The virtualization manager 128 is configured to carry out administrative tasks for the private cloud computing environment 102, including managing the hosts 110, managing the VMs 108A running on the hosts, provisioning new VMs, migrating the VMs from one host to another host, and load balancing between the hosts. One example of the virtualization manager 128 is the VMware vCenter Server® product made available from VMware, Inc.

The SDN manager 132 is configured to provide a graphical user interface (GUI) and REST APIs for creating, configuring, and monitoring SDN components, such as logical switches, and edge services gateways. The SDN manager allows configuration and orchestration of logical network components for logical switching and routing, networking and edge services, and security services and distributed firewall (DFW). Thus, the SDN manager allows users to create private native security groups (PNSGs) of VMs and define and configure private DFW policy rules with respect to the PNSGs. One example of the SDN manager is the NSX manager of VMware NSX product.

The SDN controller 130 is a distributed state management system that controls virtual networks and overlay transport tunnels. In an embodiment, the SDN controller is deployed as a cluster of highly available virtual appliances that are responsible for the programmatic deployment of virtual networks across the hybrid system 100. The SDN controller is responsible for providing configuration to other SDN components, such as the logical switches, logical routers, and edge devices. One example of the SDN controller is the NSX controller of VMware NSX product.

The CSM 134 is configured to provide a graphical user interface (GUI) and REST APIs for onboarding, configuring, and monitoring an inventory of public cloud constructs, such as VMs in the public cloud computing environment 104. In an embodiment, the CSM is implemented as a virtual appliance running in any computer system. One example of the CSM is the CSM of VMware NSX product.

The private cloud computing environment 102 further includes a network connection appliance 138 and a public network gateway 140. The network connection appliance allows the private cloud computing environment to connect to the public cloud computing environment 104 through the direct connection 107, which may be a VPN, Amazon Web Services® (AWS) Direct Connect or Microsoft® Azure® ExpressRoute connection. The public network gateway allows the private cloud computing environment to connect to the public cloud computing environment through the network 106, which may include the Internet. The public network gateway may manage external public Internet Protocol (IP) addresses for network components in the private cloud computing environment, route traffic incoming to and outgoing from the private cloud computing environment and provide networking services, such as firewalls, network address translation (NAT), and dynamic host configuration protocol (DHCP). In some embodiments, the private cloud computing environment may include only the network connection appliance or the public network gateway.

The public cloud computing environment 104 of the hybrid cloud system 100 is configured to dynamically provide cloud networks 142 in which various network and compute components can be deployed. These cloud networks 142 can be provided to various tenants, which may be business enterprises. As an example, the public cloud computing environment may be AWS cloud and the cloud networks may be virtual public clouds. As another example, the public cloud computing environment may be Azure cloud and the cloud networks may be virtual networks (VNets).

The cloud network 142 includes a network connection appliance 144, a public network gateway 146, a public cloud gateway 148 and one or more compute sub-networks 150. The network connection appliance 144 is similar to the network connection appliance 138. Thus, the network connection appliance 144 allows the cloud network 142 in the public cloud computing environment 104 to connect to the private cloud computing environment 102 through the direct connection 107, which may be a VPN, AWS Direct Connect or Azure ExpressRoute connection. The public network gateway 146 is similar to the public network gateway 140. The public network gateway 146 allows the cloud network to connect to any other network, such as the private cloud computing environment through the network 106. The public network gateway 146 may manage external public IP addresses for network components in the cloud network, route traffic incoming to and outgoing from the cloud network and provide networking services, such as firewalls, NAT and DHCP. In some embodiments, the cloud network may include only the network connection appliance 144 or the public network gateway 146.

The public cloud gateway 148 of the cloud network 142 is connected to the network connection appliance 144 and the public network gateway 146 to route data traffic from and to the compute subnets 150 of the cloud network via the network connection appliance 144 or the public network gateway 146. In particular, the public cloud gateway will allow or deny data traffic based on the PNSGs and private native DFW policy rules that have been translated or realized in the cloud network 142 in the public cloud computing environment 104. The public cloud gateway is described in more detail below.

The compute subnets 150 include virtual computing instances (VCIs), such as VMs 108B. These VMs run on hardware infrastructure provided by the public cloud computing environment 104. The VMs may be grouped based on the PNSGs that have been defined using the SDN manager 132 in the private cloud computing environment 102. The way in which the VMs are grouped based on the PNSGs will be described in more detail below.

Figure 2:
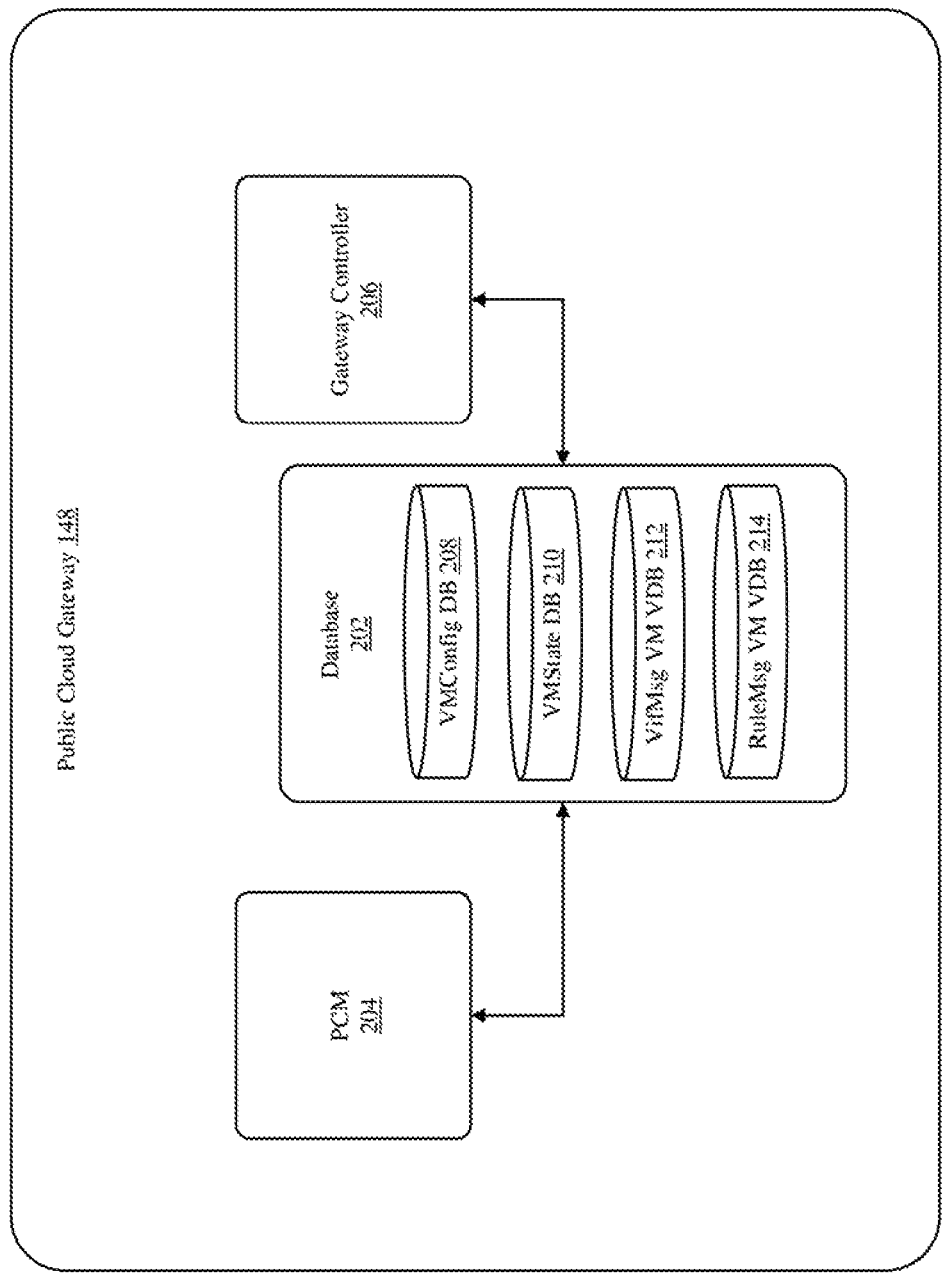
FIG. 2 shows components of a public cloud gateway included in a public cloud computing environment of the hybrid cloud system of FIG. 1 in accordance with an embodiment of the invention.

Turning now to FIG. 2, components of the public cloud gateway 148 are shown in accordance with an embodiment of the invention. As shown in FIG. 2, the public cloud gateway includes a database (DB) 202, a public cloud manager (PCM) 204 and a gateway controller 206. These components of the public cloud gateway 148 may be implemented in software in any computer system.

The DB 202 is a database of routing-related information used to manage and translate various PNSGs and private native DFW policy rules used in the private cloud computing environment 102 to corresponding cloud network security groups (CNSGs) and cloud DFW policy rules used in the cloud network 142 in the public cloud computing environment 104. As shown in FIG. 2, the DB includes a VM config DB 208, a VM state DB 210, a virtual interface (Vif) message VM virtual DB ("VifMsg VM VDB") 212, and a rule message VM VDB ("RuleMsg VM VDB") 214. In an embodiment, these databases may be contained in the DB as tables.

The VMconfig DB 208 is used to store information related to VM configurations of all VMs in the VPC, such as VM name, VM identification (ID), etc. Below is an example of information stored in the VMconfig DB 208.

```
VmConfig {
    enum ResourceType {
        INVALID = 0;
        VM = 1;
        CLOUD_NATIVE_SERVICE = 2;
    }
    enum VmQuarantineState {
        QUARANTINE_STATE_INVALID = 0; // required by nestdb, not used
        QUARANTINE_STATE_NORMAL = 1; // VM operates normally
        QUARANTINE_STATE_IGNORED = 2; // VmState reports error, but user/PCM calls to ignore
        QUARANTINE_STATE_ENABLED = 3; // Quarantine enforcement is on due to any means
    }
    // Required for cloud inventory workflow
    enum VmPowerState{
        POWER_STATE_INVALID = 0;
        POWER_STATE_UNKNOWN = 1;
        POWER_STATE_ON = 2;
        POWER_STATE_OFF = 3;
        POWER_STATE_SUSPENDED = 4;
    }
    option (object_type_id) = 44;
    option (domain) = "local/inventory";
    optional string id = 1 [(key)=true];
    // list all interfaces known to this VM
    repeated VmInterfaceConfigMsg interface = 2;
    optional VmQuarantineState quarantine_state = 3;
    optional string desired_version = 4;
    optional string name = 5;
    optional VmPowerState machine_power_state = 6;
    repeated string security_group = 7;
    repeated CloudResourceTagMsg tag = 8;
    repeated VmIdentifierMsg vm_identifier = 9;
    optional string vm_local_id = 10;
    repeated CloudResourceTagMsg system_tag = 11;
    repeated VmServiceMsg vm_service = 12;
    repeated CloudResourceTagMsg discovered_tag = 13;
    optional string cloud_network_id = 14; // VPC or VNET id
    optional string vm_external_id = 15; // should now use external_id
    optional UuidMsg vm_bios_uuid = 16;
    optional UuidMsg vm_compute_uuid = 17;
    optional bool is_agentless = 18;
    optional uint32 num_vcpu = 19;
    optional Resource Type resource_type = 20;
    optional string cloud_native_service_type = 21;
    optional string external_id = 22;
}
```

The VMState DB 210 is used to store information related to states of all VMs in the VPC, which may include power state of VM (i.e., On/Off). Below is an example of information stored in the VMState DB 210.

```
VmStateMsg {
    enum VmState {
        VM_STATE_INVALID = 0; // required by nestdb, not used
        VM_STATE_UNKNOWN = 1; // VM state
        unknown, i.e disconnected
        VM_STATE_NORMAL = 2; // VM operate normally
        VM_STATE_CAUTION = 3; // VM may be misused
        VM_STATE_ERROR = 4; // VM definitely
        is misused or misconfigure
    }
    option (object_type_id) = 45;
    option (domain) = "local/public_cloud/gw";
    optional string vm_id = 1 [(key)=true];
    // simply report VM overall state,
    // the assumption is that PCM should
    // quarantine all VIFs for the VM, if VM
    // state is VM_STATE_CAUTION
    optional VmState state = 2;
    // timestamp, epoch time in milli-second
    optional uint64 time_stamp_ms = 3;
    repeated VmThreatMsg threat = 4;
    optional string vm_version = 5;
    optional string vm_os_type = 6;
    optional string vm_os_version = 7;
    optional uint32 vm_num_vcpus = 8;
    optional string pcg_cert_tp = 9;
    optional uint32 vdb_id = 10;
    // boot up time of VM, epoch time in second
    optional uint64 boot_time = 11;
}
```

The VifMsg VM VDB 212 is used to store information related to virtual interfaces or virtual network adapters of all VMs in the VPC, such as their properties, e.g., IP addresses. Below is an example of information stored in the VifMsg VM VDB 212.

```
VmInterfaceConfigOpMsg {
    optional OpMsg self = 5001;
    optional OpMsg if_id = 1;
    optional IpAddressOpMsg ip = 2;
    optional MacAddressOpMsg mac = 3;
    optional OpMsg device_index = 4;
    optional OpMsg name = 5;
    repeated CloudResourceTagOpMsg tag = 6;
    optional OpMsg attachment_id = 7;
    repeated IpAddressOpMsg secondary_ip address = 8;
    optional OpMsg mac_address_string = 9;
    repeated IpAddressOpMsg nsx_assigned_ip = 10;
}
```

The RuleMsg VM VDB 214 is used to store information related to routing rules for VMs, such as which VMs can talk to which VMs. Below is an example of information stored in the RuleMsg VM VDB 214.

```
RuleMsg {
    option (object_type_id) = 29;
    option (domain) = "desired_state/rule";
    // Basic properties
    optional UuidMsg uuid = 18 [(key)=true];
    optional uint32 id = 1;
    optional uint64 priority = 2;
    optional UuidMsg section_id = 3
    [(parent_key)="vmware.nsx.nestdb.RuleSectionMsg"];
    optional RuleType type = 4;
    optional string tag = 5;
    //Match and action specification
    repeated ProtocolSpecMsg protocol = 6;
    optional AddressSpecMsg from_address = 7;
    optional AddressSpecMsg to_address = 8;
    optional RuleAction action = 9;
    // Specific to L3 rules only - v4 and/or v6
    optional EtherType ether_type = 17;
    // where rule is applied at.
    optional RuleDirection direction = 10;
    optional AppliedToMsg applied_to = 11;
    ...
}
```

The PCM 204 operates to manage the public cloud gateway 148 so that PNSGs and private native DFW policy rules, which are native to the private cloud computing environment 102, can be used in the cloud network 142 in the public cloud computing environment 104. As described in more detail below, the PCM uses the DB 202 to store and retrieve information to create and populate CNSG inbound rules and CNSG outbound rules for CNSGs that correspond to PNSGs for the cloud network 142 in the public cloud computing environment 104.

The gateway controller 206 operates to route data traffic received at the public cloud gateway 148 using CNSG inbound rules and CNSG outbound rules for the CNSG for the cloud network 142 in the public cloud computing environment 104 that are based on the PNSGs and private native DFW policy rules. Thus, gateway controllers 206 may deny or allow connection or data traffic between some of the PNSGs, as defined by the private native DFW policy rules.

Figure 3:
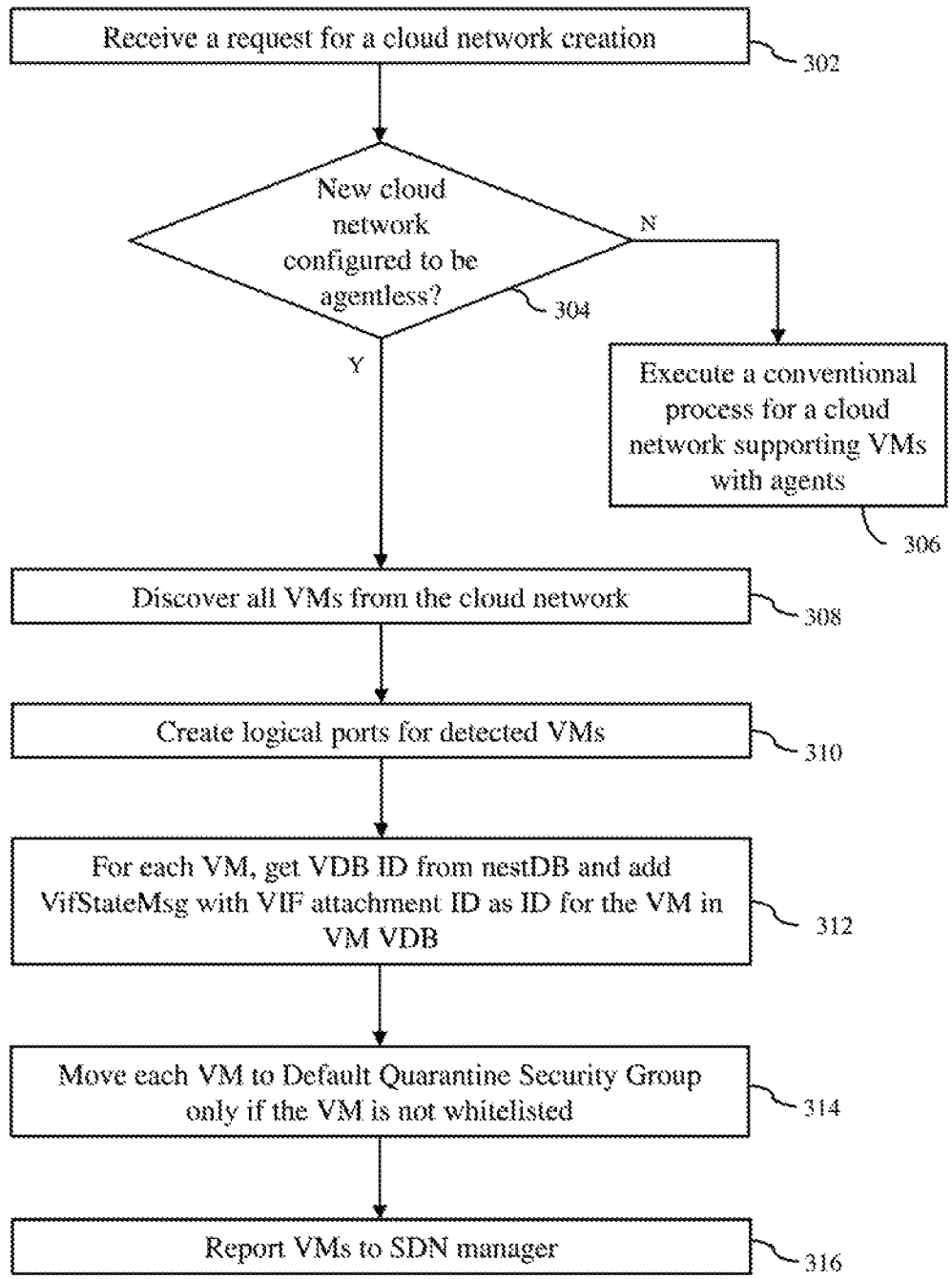
FIG. 3 is a process flow diagram of a public cloud manager (PCM) cloud inventory operation of the system of FIG. 1 for a cloud network creation request in accordance with an embodiment of the invention.

A PCM cloud inventory operation of the system 100 for a cloud network creation request in accordance with an embodiment of the invention is now described with reference to a process flow diagram of FIG. 3. The operation begins at block 302, where a cloud network creation request is received at the PCM 204. The cloud network creation request, such as a request for a VPC or a VNet, may be initially received at a user interface provided by the SDN manager 132, which allows a user to manage cloud networks created in the public cloud computing environment 104. The cloud network creation request includes various configuration of a new cloud network to be created, including whether the new cloud network will be agentless or not, i.e., whether each VCI (described herein as VM) in the new cloud network will include an agent that can assist in management of security groups and DFW policy rules.

At block 304, a determination is made by the PCM 204 whether the new cloud network is configured to be agentless. If the cloud network is not configured to be agentless, then the operation proceeds to block 306, where a conventional process is executed for a cloud network supporting VMs with agents, which may involve deploying an SDN agent in each of the VMs in the cloud network to assist in management of security groups and DFW policy rules. However, if the cloud network is configured to be agentless, then the operation proceeds to block 308.

At block 308, all the VMs in the cloud network are discovered by the PCM 204. In an embodiment, this inventory discovery process is done using cloud APIs to get a list of all the VMs.

Next, at block 310, logical ports are created for the detected VMs by the PCM 204. In an embodiment, this process is done in a standard way in which logical ports are created in a typical SDN solution.

Next, at block 312, for each discovered VM, VDB ID is retrieved from the DB 202 and VifStateMsg with VIF attachment ID as ID for the VM is added in the VM VBD. That is, for each detected VM, its unique ID is retrieved from the DB 202. Also, VIF attachment ID, which is again a unique ID, is also retrieved and the relationship between the VM and its VIF is created using the attachment ID. In an embodiment, VM VDB (all the tables in the DB 202) is created by the gateway controller 206 of the public cloud gateway 148 and VDB ID is written to the VMStateMsg for each VM. This is a sequential process. Thus, as soon as the discovery of the VM is done, VM VDB will be created for each VM.

Next, at block 314, each discovered VM is moved to a default quarantine security group (DQSG) by the PCM 204 only if the VM is not on a whitelist of VMs, which may be user defined. The purpose of whitelisted VM is for users to enable some VMs to be whitelisted so that they can by-pass this process. That is, if a VM is not on the whitelist, then that VM is moved to the DQSG. However, if a VM is on the whitelist, then that VM is not moved to the DQSG. In an embodiment, the DQSG is created by the CSM 134 for each cloud network that is created.

Next, at block 316, the VMs in the DQSG are reported to the SDN manager 132 by the PCM 204. These VMs in the DQSG will be used to place the VMs in appropriate PNSGs (also referred to herein as "SDN NSGs") that are created in response to user input.

Figure 4:
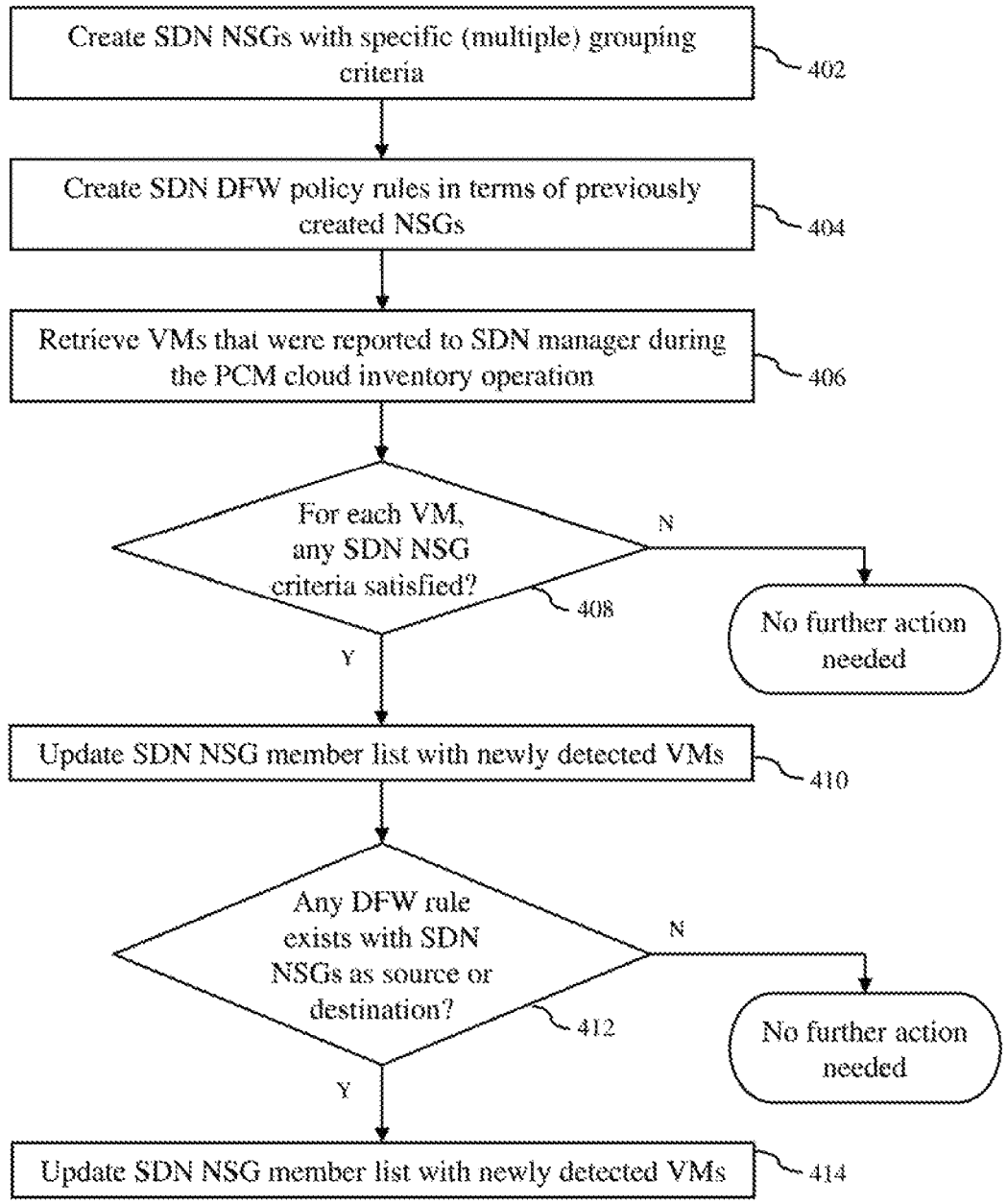
FIG. 4 is a process flow diagram of a software-defined network (SDN) virtual machine (VM) grouping and distributed firewall (DFW) policy rule creation operation of the system of FIG. 1 in accordance with an embodiment of the invention.

An SDN VM grouping and DFW policy rule creation operation of the system 100 in accordance with an embodiment of the invention is now described with reference to a process flow diagram of FIG. 4. As used herein, SDN VM grouping refers to grouping of VMs used in the private cloud computing environment 102 by the SDN manager 132. Thus, SDN NSGs refer to NSGs defined using the SDN manager 132. The operation begins at block 402, where SDN NSGs are created with one or more grouping criteria in response to user input. As an example, one of the grouping criteria can be VM with name "WEB VM" or "DB VM", which will tell the SDN controller to only qualify VMs with these names. In an embodiment, a user interface provided by the SDN manager 132 may be used by a user to input the grouping criteria.

Next, at block 404, SDN DFW policy rules are created in terms of previously created NSGs by the PCM 204. Thus, the SDN DFW policy rules may refer to other NSGs as source or destination.

Next, at block 406, the VMs that were reported to the NSX manager during the PCM cloud inventory operation are retrieved. These VMs are the VMs that are currently in the DQSG.

Next, at block 408, for each of these VMs, a determination is made whether that VM satisfies any SDN NSG criteria. If the VM does not satisfy any SDN NSG criteria, then no further action is needed for that VM. However, if the VM does satisfy any SDN NSG criteria, then the operation proceeds to block 410, where the SDN NSG member list is updated for each new SDN NSG with all the newly detected VMs that satisfies one or more SDN NSG criteria. That is, these VMs are assigned to their respective SDN NSGs based on the SDN NSG criteria.

Next, at block 412, a determination is made whether any DFW rule exists with the SDN NSGs as source or destination. If no such DFW rule exists, then no further action is needed. However, if any such DFW rule exists, then the operation proceeds to block 414, where an SDN DFW policy rule realization operation is executed in the cloud network 142 in the public cloud computing environment 104, which is described below with respect to the flow diagram of FIG. 5. This operation will vary depending on the public cloud computing environment 104, e.g., AWS or Azure cloud, as described in more detail below.

The operation of the PCM 204 to realize SDN DFW policy rules in the cloud network 142 in the public cloud computing environment 104 in accordance with an embodiment of the invention is now described with reference to a process flow diagram of FIG. 5. The operation begins at block 502, where a notification for VM VDB change is received by the PCM 204. A VM VDB change is a change in the state of a VM, such as its name change or its power state change. In an embodiment, the notification includes at least a list of one or more SDN DFW policy rules to be realized in the cloud network.

Next, at block 504, in response to the notification, all SDN DFW policy rules included in the notification are extracted from the VM VDB by the PCM 204. In an embodiment, the VM VDB IDs are used by the PCM to extract the relevant SDN DFW policy rules.

Next, at block 506, relevant information is extracted from one of the SDN DFW policy rules by the PCM 204. In an embodiment, the relevant information extracted from the SDN DFW policy rule includes source, destination, protocol, port, action and direction information. The source of the rule defines a PNSG from which data traffic originated. The destination of the rule defines a PNSG to which data traffic is destined. The protocol of the rule defines the protocol used for data traffic, such as transmission control protocol (TCP). The port of the rule defines which defines the port number for data traffic. The action of the rule defines action to be taken when the rule is being applied, such as deny or allow. The direction information defines the direction of data traffic, i.e., whether inbound or outbound.

Next, at block 508, the SDN DFW policy rule is processed by the PCM 204 to create a corresponding CNSG rule object and populate the rule object with appropriate rule or rules so that the SDN DFW policy rule can be applied in the public cloud computing environment 104 using that corresponding CNSG rule object. In an embodiment, this involves using the corresponding CNSG rule object to route data traffic based on the SDN DFW policy rule. This process of processing NSX rule will be further described below in detail with respect to FIGS. 6-9.

Next, at block 510, a determination is made by the PCM 204 whether all SDN DFW policy rules have been processed. If not all SDN DFW policy rules have been processed, then the operation proceeds back to block 506 to process another SDN DFW policy rule. However, if all SDN DFW policy rules have been processed, then the operation proceeds to block 512.

At block 512, all CNSG rule objects are consolidated, and an effective set is created to take appropriate actions in the cloud network 142 in the public cloud computing environment 104 using the rules defined in the CNSG rule objects.

Figure 5:
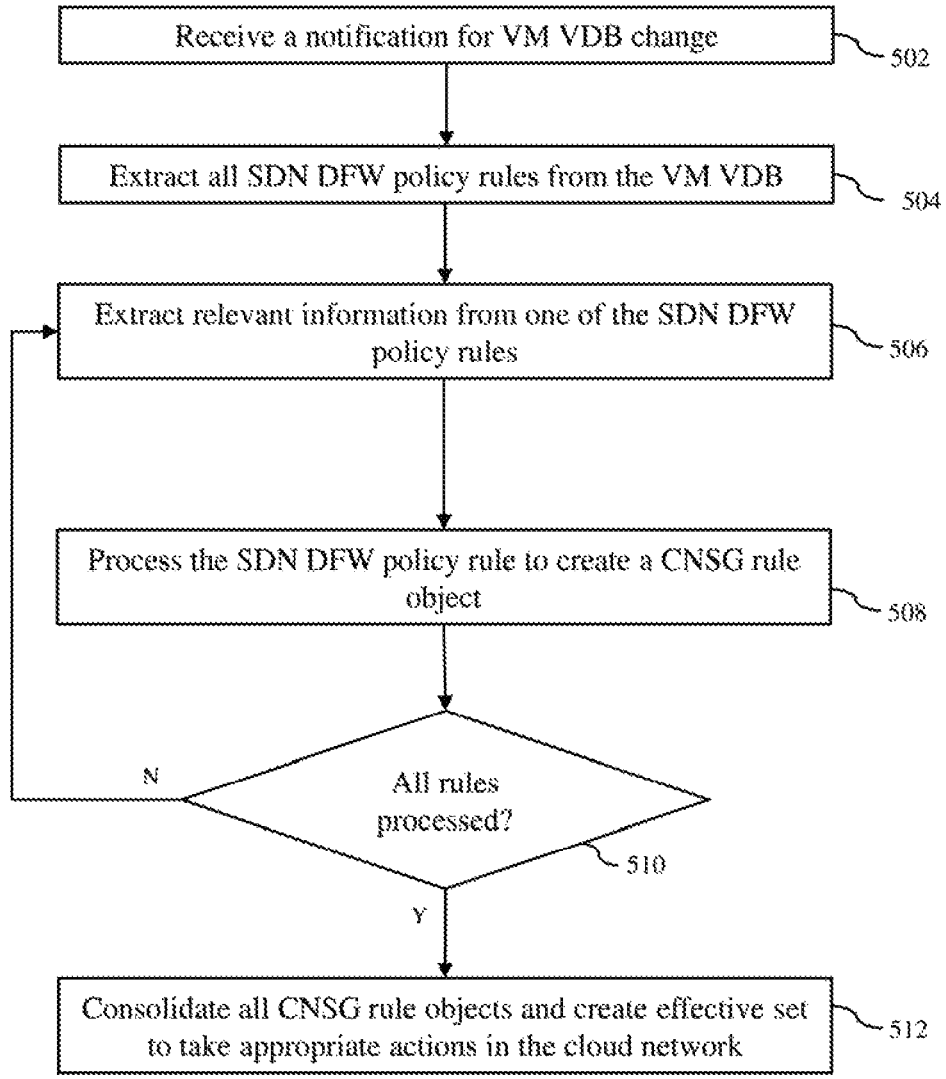
FIG. 5 is a process flow diagram of an operation of the PCM to realize SDN DFW policy rules in a cloud network in the public cloud computing environment in accordance with an embodiment of the invention.

The SDN DFW policy rule processing operation performed at block 508 of FIG. 5 will depend on the particular cloud type of the public cloud computing environment 104. That is, this operation will vary depending on the public cloud computing environment 104 in which the cloud network is created.

Figure 6:
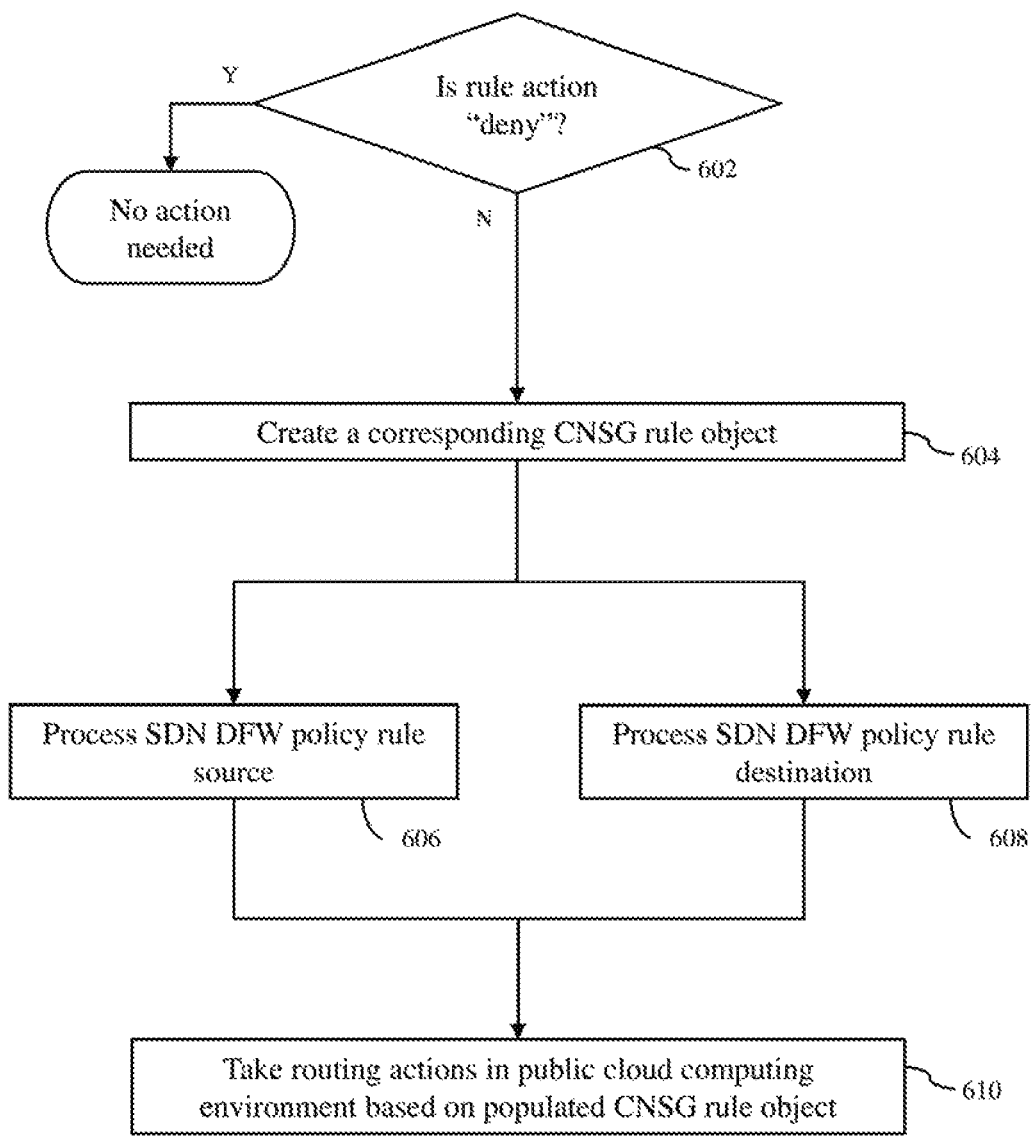
FIG. 6 is a process flow diagram of an operation to process an SDN DFW policy rule for a cloud network in Amazon Web Services® (AWS) cloud in accordance with an embodiment of the invention.

An operation to process an SDN DFW policy rule for the cloud network 142 in AWS cloud performed by the PCM 204 in accordance with an embodiment of the invention is now described with reference to a process flow diagram of FIG. 6. The operation begins at block 602, where a determination is made whether the action of the SDN DFW policy rule is "deny". If the rule action is "deny", then no action needed. This is due to the fact that firewall policy rules for AWS NSGs in the AWS cloud by default are "deny", and thus, no action is required. However, if the rule action is not "deny", then the operation proceeds to block 604.

At block 604, a CNSG rule object corresponding to the SDN DFW policy rule is created. Next, the source of the SDN DFW policy rule is processed at block 606. In addition, the destination of the SDN DFW policy rule is processed at block 608. These two processes may be executed in parallel, i.e., concurrently, or may be sequentially executed. The processing of the source of the SDN DFW policy rule is described in detail below with reference to FIG. 7A. The processing of the destination of the SDN DFW policy rule is described in detail below with reference to FIG. 7B.

Next, at block 610, actions are taken in the public cloud computing environment 104, i.e., AWS cloud in this implementation, based on the populated CNSG rule object when applicable, i.e., when data traffic received at the public cloud gateway 148 is the type of data traffic defined in the CNSG rule object. Thus, the gateway controller 206 of the public cloud gateway 148 may block or allow data traffic based on this populated CNSG rule object, as well as other populated CNSG rule objects.

Figure 7A:
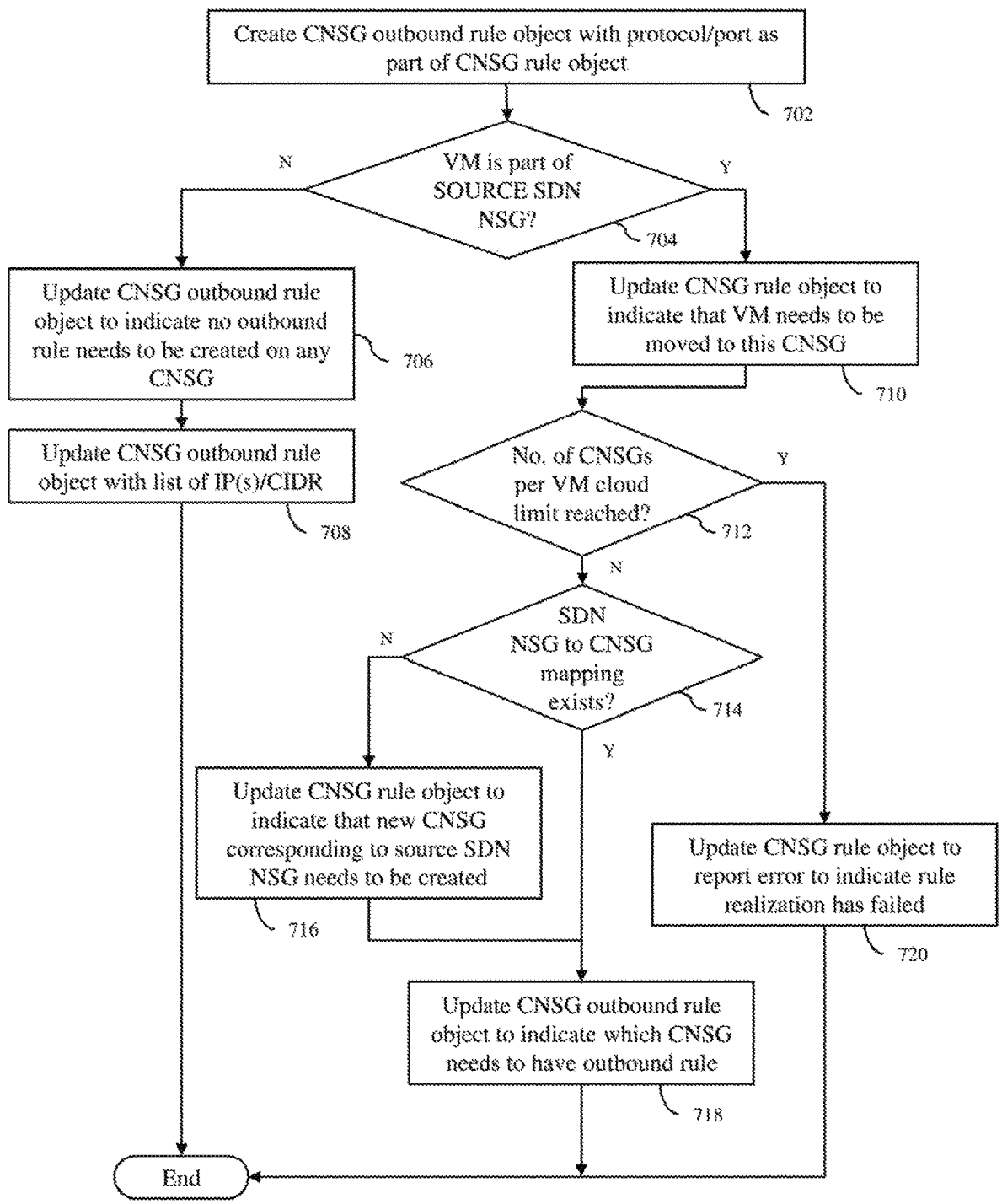
FIG. 7A is a process flow diagram of an operation to process SDN DFW policy rule source for AWS cloud in accordance with an embodiment of the invention.

Turning now to FIG. 7A, a process flow diagram of the operation to process SDN DFW policy rule source by the PCM 204 for AWS cloud in accordance with an embodiment of the invention is shown. At block 702, a CNSG outbound rule object with protocol and/or port is created as part of the CNSG rule object.

Next, at block 704, a determination is made whether the VM is part of the source SDN NSG, i.e., whether the VM is member of the SDN NSG that can be considered as a source for the SDN DFW policy rule. If the VM is not part of the source SDN NSG, the operation proceeds to block 706. If the VM is part of the source SDN NSG, then the operation proceeds to block 710.

At block 706, the CNSG outbound rule object is updated to indicate that no outbound rule needs to be created on any CNSG. Next, at block 708, the CNSG outbound rule object is updated with a list of IP addresses or CIDR notations, which are the IP addresses or CIDR notations of the source SDN NSG. In an embodiment, the CNSG outbound rule object is updated by making cloud API calls to change outbound rules to remove any previously existing rules from outbound when VM was part of SDN NSG. The operation is now complete.

At block 710, the CNSG rule object is updated to indicate that the VM needs to be moved to this CNSG. Next, at block 712, a determination is made whether the number of CNSGs according to the VM cloud limit of AWS cloud has been reached. The VM cloud limit is the number of CNSGs allowed for a single cloud network, i.e., one AWS VPC. If the VM cloud limit has been reached, then the operation proceeds to block 720, where the CNSG rule object is updated to report an error to indicate that the rule realization has failed. The operation is now complete.

However, if the VM cloud limit has not been reached, then the operation proceeds to block 714, where a determination is made whether SDN to CNSG mapping exist. If such mapping does not exist, then the operation proceeds to block 716, where the CNSG rule object is updated to indicate that a new CNSG corresponding to source SDN NSG needs to be created. This corresponding CNSG is created using the protocol established for AWS cloud. The operation then proceeds to block 718.

However, if an SDN to CNSG mapping does exist, then the operation proceeds directly to block 718, where the CNSG outbound rule object is updated to indicate which CNSG needs to have the outbound rule according to the SDN DFW policy rule. The operation is now complete.

Figure 7B:
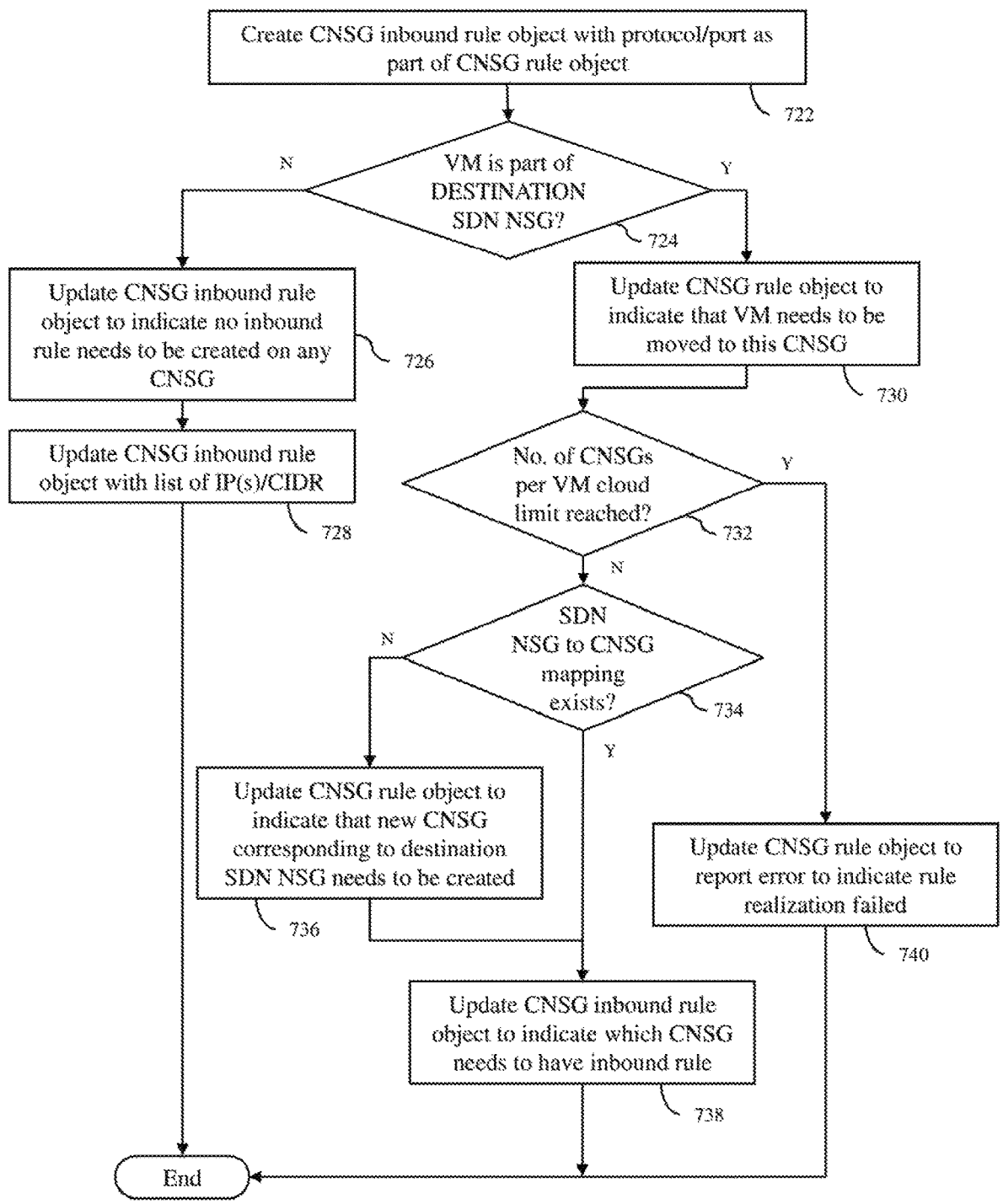
FIG. 7B is a process flow diagram of an operation to process SDN DFW policy rule destination for AWS cloud in accordance with an embodiment of the invention.

Turning now to FIG. 7B, a process flow diagram of the operation to process SDN DFW policy rule destination by the PCM 204 for AWS cloud in accordance with an embodiment of the invention is shown. At block 722, a CNSG inbound rule object with protocol and/or port is created as part of the CNSG rule object Next, at block 724, a determination is made whether the VM is part of the destination SDN NSG, i.e., whether the VM is member of the SDN NSG that can be considered as a destination for the SDN DFW policy rule. If the VM is not part of the destination SDN NSG, the operation proceeds to block 726. If the VM is part of the destination NSX NSG, then the operation proceeds to block 730.

At block 726, the CNSG inbound rule object is updated to indicate that no inbound rule needs to be created on any CNSG. Next, at block 728, the CNSG inbound rule object is updated with a list of IP addresses or CIDR notations. The operation is now complete.

At block 730, the CNSG rule object is updated to indicate that the VM needs to be moved to this CNSG. Next, at block 732, a determination is made whether the number of CNSGs according to the VM cloud limit of AWS cloud has been reached. If the VM cloud limit has been reached, then the operation proceeds to block 740, where the CNSG rule object is updated to report an error to indicate that the rule realization has failed. The operation is now complete.

However, if the VM cloud limit has not been reached, then the operation proceeds to block 734, where a determination is made whether SDN NSG to CNSG mapping exists. If such mapping does not exist, then the operation proceeds to block 736, where the CNSG rule object is updated to indicate that a new CNSG corresponding to destination SDN NSG needs to be created. The operation then proceeds to block 738.

However, if an NSX NSG to CNSG mapping does exist, then the operation proceeds directly to block 738, where the CNSG inbound rule object is updated to indicate which CNSG needs to have the inbound rule according to the SDN DFW policy rule. The operation is now complete.

Figure 8:
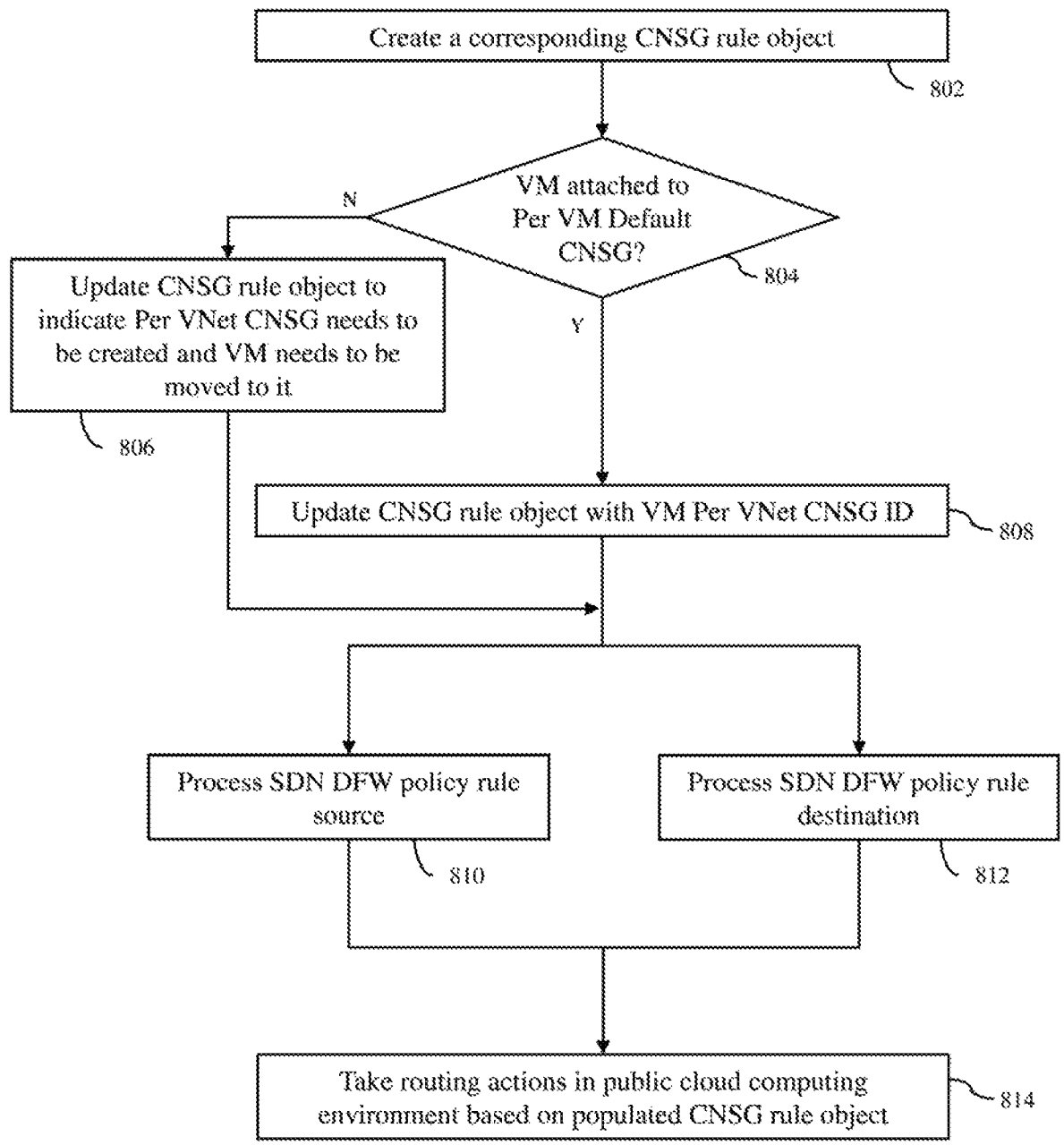
FIG. 8 is a process flow diagram of an operation to process an SDN DFW policy rule for a cloud network in Microsoft® Azure® cloud in accordance with an embodiment of the invention.

An operation to process an SDN DFW policy rule performed by the PCM 204 for Azure cloud in accordance with an embodiment of the invention is now described with reference to a process flow diagram of FIG. 8. The operation begins at block 802, where a corresponding CNSG rule object is created. That is, a new CNSG rule object corresponding to the SDN DFW policy rule being processed is created.

Next, at block 804, a determination is made whether the VM is attached to a Per VM Default CNSG. This security group is the default security group provided by respective cloud. For example, in AWS cloud, every VPC has a default security group, which has the name "default security group". If the VM is not attached to the Per VM Default CNSG, then the operation proceeds to block 806, where the CNSG rule object is updated to indicate a Per VNet CNSG needs to be created and the VM needs to be moved to it. The operation then proceeds to blocks 810 and 812.

However, if the VM is attached to the Per VM Default CNSG, then the operation proceeds to block 808, where the CNSG rule object is updated with VM Per VNet CNSG ID, which is the unique ID of CNSG provided by cloud for multiple VMs. The operation then proceeds to blocks 810 and 812.

At block 810, the source of the SDN DFW policy rule is processed. In addition, at block 812, the destination of the SDN DFW policy rule is processed. These two processes may be executed in parallel, i.e., concurrently, or may be sequentially executed. The processing of the source of the SDN DFW policy rule is described in detail below with reference to FIG. 9A. The processing of the destination of the SDN DFW policy rule is described in detail below with reference to FIG. 9B.

Next, at block 814, routing actions are taken in the public cloud computing environment 104, i.e., Azure cloud in this implementation, based on the populated CNSG rule object when applicable.

Figure 9A:
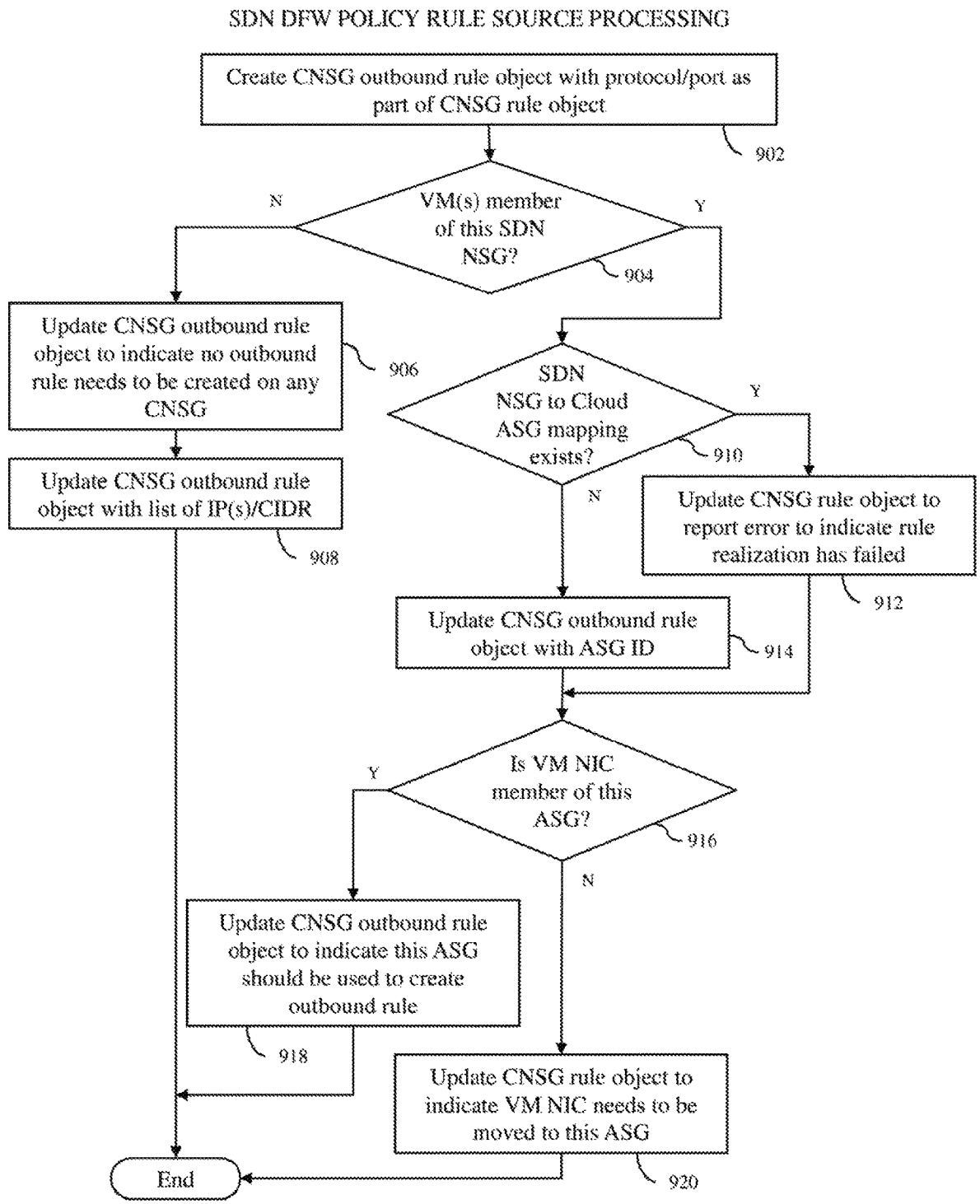
FIG. 9A is a process flow diagram of an operation to process SDN DFW policy rule source for Azure cloud in accordance with an embodiment of the invention.
Figure 9B:
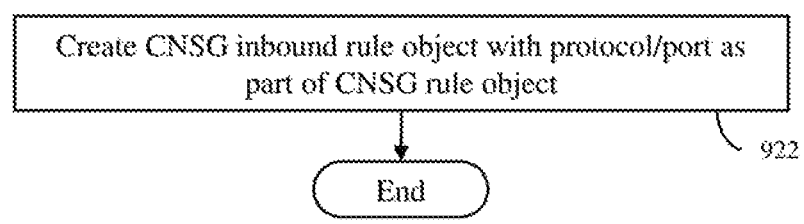
FIG. 9B is a process flow diagram of an operation to process SDN DFW policy rule destination for Azure cloud in accordance with an embodiment of the invention.

Turning now to FIG. 9A, a process flow diagram of the operation to process SDN DFW policy rule source by the PCM for Azure cloud in accordance with an embodiment of the invention is shown. At block 902, a CNSG outbound rule object with protocol and/or port is created as part of the CNSG rule object.

Next, at block 904, a determination is made whether the VM is member of this SDN NSG. If the VM is not a member of the SD NSG, the operation proceeds to block 906. If the VM is a member of the SDN NSG, then the operation proceeds to block 910.

At block 906, the CNSG outbound rule object is updated to indicate that no outbound rule needs to be created on any CNSG. Next, at block 908, the CNSG outbound rule object is updated with a list of IP addresses or CIDR notations, which are the IP addresses or CIDR notations of the source SDN NSG. The operation is now complete.

At block 910, a determination is made whether SDN NSG to application security group (ASG) of Azure cloud mapping exists. If such mapping does exist, then the operation proceeds to block 912, where the CNSG rule object is updated to report an error to indicate that the rule realization has failed. The operation then proceeds to block 916.

However, if an SDN NSG to AGS mapping does not exist, then the operation proceeds direct to block 914, where the CNSG outbound rule is updated with the ID of the AGS. The operation then proceeds to block 916.

At block 916, a determination is made whether the VM NIC is a member of this ASG. In an embodiment, the ASG includes only VM NICs. However, this can change depending on the cloud provided features. If the VM NIC is a member of the ASG, the operation proceeds to block 918, where the CNSG outbound rule object is updated to indicate that this AGS should be used to create the outbound rule. The operation is now complete.

However, if the VM NIC is not a member of the ASG, the operation proceeds to block 920, where the CNSG rule is updated to indicate to that the VM NIC needs to be moved to this AGS. The operation is now complete Turning now to FIG. 9B, a process flow diagram of the operation to process SDN DFW policy rule destination by the PCM 204 for Azure cloud in accordance with an embodiment of the invention is shown. At block 922, a CNSG inbound rule object with protocol and/or port is created as part of the CNSG rule object. The operation is now complete.

Some examples of the SDN DFW policy rule processing are now described for the implementation where the SDN NSGs are NSX NSGs and SDN DFW policy rules are NSX DFW policy rules using VMware NSX technology. In these examples, the following NSX NSGs are created with one VM as member of each NSX NSG.

Web-Group—VM-web is member.
App-Group—VM-app is member.
Db-Group—VM-db is member.
CidrOnly-Group—13.x.x.x/16
CidrPlusVm-Group—14.x.x.x/16 plus VM-other NSX DFW policy rules are created in terms of the above NSX NSGs. Corresponding realizations on AWS and Azure clouds are shown below.

The first NSX rule is as follows:

| Source | Destination | Port/Service | Protocol | Action | Direction | Stateful |
|---|---|---|---|---|---|---|
| Web-Group | App-Group | 8080 | TCP | Allow | IN | Yes |

This rule allows ONLY incoming traffic [tcp/8080] from Web-Group VM(s)-To App-Group VM(s)

For AWS cloud, the current state is as follows: VM-web and VM-app are in Default Quarantine CNSG (per VPC CNSG). The following actions are performed by the PCM 204: (1) create App-Group-CNSG and attach to VM-app, and (2) create Web-Group-CNSG and attach to VM-web. In addition, inbound rule for App-Group-CNSG is updated by the PCM as follows:

| Type | Protocol | Port | Source |
|---|---|---|---|
| Custom TCP Rule | TCP | 8080 | Web-Group-CNSG |

For Azure cloud, the current stat is as follows: VM-web and VM-app are in Default Quarantine CNSG (i.e., PER-VNET-CNSG). The following actions are performed by the PCM 204: (1) create PER-VNET-CNSG, (2) move VM-web to its PER-VNET-CNSG, (3) move VM-app to its PER-VNET-CNSG, (4) create App-Group-CNSG and attach to VM-app NIC, (5) create Web-Group-ASG and attach to VM-web NIC. In addition, the inbound rule for PER-VNET-CNSG is updated by the PCM as follows:

| Priority | Port | Protocol | Source | Destination | Action |
|---|---|---|---|---|---|
| xxx | 8080 | TCP | Web-Group-ASG | App-Group-ASG | Allow |

Also, the outbound rule for PER-VNET-CNSG is also updated by the PCM as follows:

| Priority | Port | Protocol | Source | Destination | Action |
|---|---|---|---|---|---|
| xxx | 8080 | TCP | Web-Group-ASG | App-Group-ASG | Allow |

The second NSX rule is as follows:

| Source | Destination | Port/Service | Protocol | Action | Direction | Stateful |
|---|---|---|---|---|---|---|
| App-Group | DB-Group | 22 | TCP | Allow | IN/OUT | Yes |

This rule allows incoming traffic [tcp/22] from App-Group VM(s) to DB-Group VM(s) and allows outgoing traffic [tcp/22] from App-Group VM(s) to DB-Group VM(s).

For AWS cloud, the current state is as follows: VM-app and VM-db are in Default Quarantine CNSG (i.e., per VPC CNSG). The following actions are performed by the PCM 204: (1) create App-Group-CNSG and attach to VM-app, and (2) create DB-Group-CNSG and attach to VM-db. In addition, the outbound rule for App-Group-CNSG is updated by the PCM as follows:

| Type | Protocol | Port | Destination |
|---|---|---|---|
| Custom TCP Rule | TCP | 22 | DB-Group-CNSG |

Also, the inbound rule for DB-Group-CNSG is also updated by the PCM 204 as follows:

| Type | Protocol | Port | Source |
|---|---|---|---|
| Custom TCP Rule | TCP | 22 | App-Group-CNSG |

For Azure cloud, the current state is as follows: VM-app and VM-db are in Default Quarantine CNSG (i.e., PER-VNET-CNSG). The following actions are performed by the PCM 204: (1) create PER-VNET-NSX-CNSG and attach to VM-app NIC, and (2) create DB-Group-ASG and attach to VM-db NIC, (3) move VM-db to its PER-VNET-NSX-CNSG, and (4) move VM-app to its PER-VNET-NSX-CNSG. In addition, the inbound rule for PER-VNET-CNSG is updated by the PCM as follows:

| Priority | Port | Proto | Source | Destination | Action |
|---|---|---|---|---|---|
| xxx | 22 | TCP | App-Group-ASG | DB-Group-ASG | Allow |

Also, the inbound rule for DB-Group-CNSG is also updated by the PCM 204 as follows:

| Priority | Port | Proto | Source | Destination | Action |
|---|---|---|---|---|---|
| xxx | 22 | TCP | App-Group-ASG | DB-Group-ASG | Allow |

The third NSX rule is as follows:

| Source | Destination | Port/Service | Protocol | Action | Direction | Stateful |
|---|---|---|---|---|---|---|
| CidrPlus Vm-Group | Db-Group | 8080 | TCP | Allow | IN | Yes |

This rule allows only incoming traffic [tcp/8080] from CidrPlusVm-Group VM(s) to DB-Group VM(s).

For AWS cloud, the current state is as follows: VM-web and VM-app are in Default Quarantine CNSG (per VPC CNSG). The following actions are performed by the PCM 204: (1) create DB-Group-CNSG and attach to VM-db, (2) create CidrPlusVM-Group-CNSG and attach to VM-other. In addition, the inbound rule for DB-Group-CNSG is updated by the PCM as follows:

| Type | Protocol | Port | Source |
|---|---|---|---|
| Custom TCP Rule | TCP | 8080 | CidrPlusVm-Group-CNSG |

| Type | Protocol | Port | Source |
|---|---|---|---|
| Custom TCP Rule | TCP | 8080 | 14.x.x.x/16 |

For Azure cloud, the current state is as follows: VM-other and VM-db are in Default Quarantine CNSG (i.e., PER-VNET-CNSG). The following actions are performed by the PCM 204: (1) create PER-VNET-CNSG, (2) move VM-other to its PER-VNET-NSX-CNSG, (3) create DB-Group-ASG and attach to VM-db NIC, and (4) create CidrPlusVm-Group-ASG and attach to VM-other NIC. In addition, the inbound rule for PER-VNET-CNSG is updated by the PCM as follows:

| Priority | Port | Protocol | Source | Destination | Action |
|---|---|---|---|---|---|
| xxx | 8080 | TCP | CidrPlusVm-Group-ASG | Db-Group-ASG | Allow |

| Priority | Port | Protocol | Source | Destination | Action |
|---|---|---|---|---|---|
| xxx | 8080 | TCP | 14.x.x.x/16 | Db-Group-ASG | Allow |

Also, the outbound rule for PER-VNET-CNSG is also updated by the PCM 204 as follows:

| Priority | Port | Protocol | Source | Destination | Action |
|---|---|---|---|---|---|
| Xxx | 8080 | TCP | CidrPlusVm-Group-ASG | Db-Group-ASG | Allow |

The fourth NSX rule is as follows:

| Source | Destination | Port/Service | Protocol | Action | Direction | Stateful |
|---|---|---|---|---|---|---|
| Web-Group | CIDR only group | All | All | Allow | OUT | Yes |

This rule allows only outbound traffic [tcp/8080] from Web-Group VM(s) to CIDRs.

For AWS cloud, the current state is as follows: VM-web is Default Quarantine CNSG (i.e., PER-VPC-CNSG). The following actions are performed by the PCM: (1) create Web-Group-CNSG and attach to VM-web, and (2) update the outbound rules for Web-Group-CNSG as follows:

| Type | Protocol | Port | Destination |
|---|---|---|---|
| Custom | All | All | CIDR List |

For Azure cloud, no action is needed.
The fifth NSX rule is as follows:

| Source | Destination | Port/Service | Protocol | Action | Direction | Stateful |
|---|---|---|---|---|---|---|
| Web-Group | Db-Group | 8080 | TCP | Deny | IN/OUT | Yes |

This rule denies incoming traffic [tcp/8080] from Web-Group VM(s) to App-Group VM(s) and denies incoming traffic [tcp/8080] from App-Group-VM(s) to Web-Group VM(s). In addition, this rule denies outgoing traffic [tcp/8080] from Web-Group VM(s) to App-Group VM(s) and denies outgoing traffic [tcp/8080] from App-Group-VM(s) to Web-Group VM(s).

For AWS cloud, this rule is not supported. For Azure cloud, no action is needed.

The sixth NSX rule is as follows:

| Source | Destination | Port/Service | Protocol | Action | Direction | Stateful |
|---|---|---|---|---|---|---|
| Any | Db-Group | 22 | TCP | Deny | In/Out | Yes |

This rule denies incoming traffic [tcp/22] from any VM(s) to DB-Group VM(s). In addition, this rule denies outgoing traffic [tcp/22] from any VM(s) to DB-Group VM(s).

For AWS cloud, this rule is not supported. For Azure cloud, no action is needed.

The seventh NSX rule is as follows:

| Source | Destination | Port/Service | Protocol | Action | Direction | Stateful |
|---|---|---|---|---|---|---|
| CidrPlusVm-Group | Db-Group | 8080 | TCP | Deny | In/Out | Yes |

This rule denies incoming traffic [tcp/8080] from CidrPlusVm-Group VM(s) to DB-Group VM(s). In addition, this rule denies outgoing traffic [tcp/8080] from CidrPlusVm-Group VM(s) to DB-Group VM(s).

For AWS cloud, this rule is not supported. For Azure cloud, no action is needed.

The eight NSX rule is as follows:

| Source | Destination | Port/Service | Protocol | Action | Direction | Stateful |
|---|---|---|---|---|---|---|
| CidrOnly-Group | CidrOnly-Group | 8080 | TCP | Allow/Deny | In/Out | Yes |

This rule allows incoming traffic [tcp/8080] from CidrOnly-Group VM(s) to CidrOnly-Group VM(s). In addition, this rule denies outgoing traffic [tcp/8080] from CidrOnly-Group VM(s) to CidrOnly-Group VM(s).

For AWS cloud, this rule is not supported. For Azure cloud, this rule is also not supported.

In an embodiment, NSX DFW policy rules that are stateless rules are not supported for AWS and Azure clouds.

An example of a workflow for securing a multi-tier application in AWS cloud using only the SDN manager 132 or using both the SDN manager and the CSM 134 in accordance with an embodiment of the invention is now described. Similar workflow can be used in Azure cloud. In this example, the SDN manager is an NSX manager and the CSM is a VMware CSM. The steps of this workflow involve a user of the hybrid system 100, the PCM 204, the NSX manager 132 and the CSM 134 (if implemented in the private cloud computing environment 102), as well as a grouping object provider and a DFW policy provider, which may be part of or associated with the NSX manager.

The workflow begins at step 1, where the user creates the following grouping objects with membership criteria: a) App Group: VM with name prefix APP_, b) DB Group: VM with IP range 10.11.12.0/24, and c) ObjectStore Group: CIDR 51.52.0.0/16.

Next, at step 2, the user creates a security policy using a user interface provided by the NSX manager 132. In this example, the user creates the following two security policy rules: (Source App Group, Destination DB Group, TCP/54321, ALLOW, ALL) and (Source DB Group, Destination ObjectStore Group, TCP/12345, ALLOW, ALL).

Next, at step 3, when the enforcement point is associated with the policy definition, the grouping object provider receives notification as follows: a) Create App Group, b) create DB Group and c) create ObjectStore Group.

Next, at step 4, the DFW policy provider receives notification as follows: 1. Firewall Rule ALLOW TCP:54321 from App Group→DB Group, and 2. Firewall Rule ALLOW TCP:12345 from DB Group→ObjectStore Group.

Next, at step 5, if only the NSX manager 132 is being used, the NSX manager creates Grouping Objects for App Group, DB Group, ObjectStore Group, and push the corresponding Container IDs to the PCM 204 via the SDN controller 130, e.g., a NSX controller, and the DB 202. The NSX manager may need to also push group membership criteria to the NSX controller. However, if both the CSM 134 and the NSX manager 132 are being used, the CSM registers additional policy provider and receive the same notifications. In addition, the NSX manager also receive these notifications and perform the actions as described above for when only the NSX manager is being used.

Next, at step 6, if only the NSX manager 132 is being used, the PCM 204 will detect a new Container ID being pushed and create a corresponding Security Group in AWS cloud. However, if both the CSM 134 and the NSX manager 132 are being used, the CSM uses cloud specific plugin to perform CRUD (create, read, update and delete) operation for App Group, DB Group, ObjectStore Group.

Next, at step 7, if only the NSX manager 132 is being used, the NSX manager translates the DFW rule and push it down to the PCM 204 via the SDN controller, e.g., an NSX controller, and the DB 202. However, if both the CSM 134 and the NSX manager 132 are being used, the CSM creates inbound rules in DB Group and ObjectStore Group to allow VMs in App Group and DB Group to communicate with them on specified Protocol and Port, respectively. In addition, the NSX manager also receive these notifications and perform action as described above.

Next, at step 8, if only the NSX manager 132 is being used, the PCM 204 updates the DFW rules as inbound constraints in corresponding Security Groups. However, if both the CSM 134 and the NSX manager 132 are being used, the CSM pushes details of App, DB and ObjectStore groups to the PCM 204 via API along with membership criteria, which are then stored in the DB 202 by the PCM 204.

Next, at step 9, the user provisions a new VM in AWS VPC in default (quarantine) security group, with the name APP_1.

Next, at step 10, the PCM 204 discovers the VM details and notifies the NSX manager 132. The NSX manager uses existing mechanisms to map VM to NSX security group and sends this information to the PCM 204, which then determines that the VM with name APP_1 should be moved to App Group. If only the NSX manager is being used, the PCM needs to maintain the mapping between NSX group and corresponding native group (created in step 6). The PCM uses these two sets of information (VM→NSX group) and (NSX group→Native Security Group) to move VM to appropriate native group. However, if both the CSM 134 and the NSX manager 132 are being used, the CSM maintains a mapping between Native Security Group and corresponding NSX Grouping Object and shares this information with the PCM, which will use these two sets of information (VM→NSX group) and (NSX group→Native Security Group) to move VM to appropriate native group.

Next, at step 11, the user provisions a new VM in AWS VPC in default (quarantine) security group, with the IP address 10.11.12.2.

Next, at step 12, the PCM 204 discovers the VM details and perform a reverse mapping of VM IP to Group. The PCM will then determine that the VM with IP 10.11.12.2 should be moved to DB Group. If only the NSX manager 132 is being used, the PCM needs to maintain the mapping between NSX group and corresponding native group (created in step 6). The PCM uses these two sets of information (VM→NSX group) and (NSX group→Native Security Group) to move VM to appropriate native group. However, if both the CSM 134 and the NSX manager 132 are being used, the CSM maintains a mapping between Native Security Group and corresponding NSX Grouping Object and shares this information with the PCM, which will use these two sets of information (VM→NSX group) and (NSX group→Native Security Group) to move VM to appropriate native group.

Next, at step 13, the user provisions an S3 bucket with CIDR, for example, 51.52.0.0/16 (or conversely, after an S3 bucket has been assigned appropriate CIDR, user updates the membership criteria of ObjectStore Group). The user should attach a (default) BLOCK ALL policy to it.

Next, at step 14, the PCM 204 discovers the S3 bucket in VPC.

Next, at step 15, if both the CSM 134 and the NSX manager 132 are being used, the PCM 204 informs the CSM of the S3 bucket. However, if only the NSX manager is being used, no action is required for this step.

Next, at step 16, if only the NSX manager 132 is being used, the PCM 204 creates an IAM policy with subnet as the S3 CIDR and accesses condition as DB VM IP (10.11.12.2). The PCM also removes the (default) BLOCK ALL policy. However, if both the CSM 134 and the NSX manager 132 are being used, the CSM creates an IAM policy with subnet as the S3 CIDR and accesses condition as DB VM IP (10.11.12.2). The CSM also removers the (default) BLOCK ALL policy.

Figure 10:
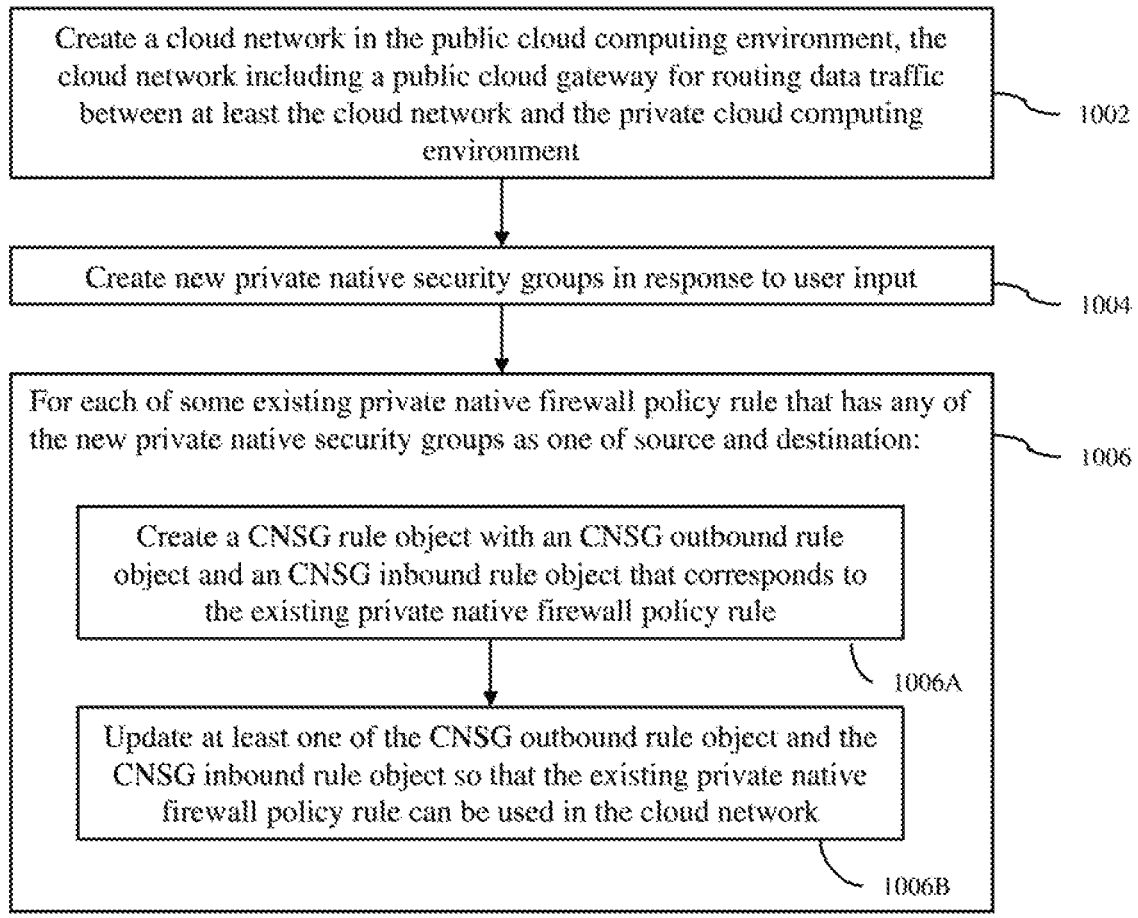
FIG. 10 is a flow diagram of a computer-implemented method for using private native security groups and private native firewall policy rules for a private cloud computing environment in a public cloud computing environment in accordance with an embodiment of the invention.

A computer-implemented method for using private native security groups and private native firewall policy rules for a private cloud computing environment and a public cloud computing environment in accordance with an embodiment of the invention is described with reference to a flow diagram of FIG. 10. At block 1002, a cloud network is created in the public cloud computing environment. This cloud network includes a public cloud gateway for routing data traffic between at least the cloud network and the private cloud computing environment. At block 1004, new private native security groups (PNSGs) are created in response to user input. At block 1006, for each of some private native firewall policy rules that has any of the new private native security groups as one of source and destination, a cloud native security group (CNSG) rule object with an CNSG outbound rule object and an CNSG inbound rule object for the public cloud computing environment is created that corresponds to a private native firewall policy rule (block 1006A) and at least one of the CNSG outbound rule object and the CNSG inbound rule object are updated so that the private native firewall policy rule can be used in the cloud network (block 1006B).

The operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for using private native security groups and private native firewall policy rules for a private cloud computing environment and a public cloud computing environment, the method comprising:
    creating a cloud network with virtual computing instances in the public cloud computing environment, the cloud network including a public cloud gateway for routing data traffic between at least the cloud network and the private cloud computing environment;
    creating new private native security groups (PNSGs) in response to user input; and
    for at least one of private native firewall policy rules that has any of the new private native security groups as one of source and destination:
        creating a cloud native security group (CNSG) rule object with an CNSG outbound rule object and an CNSG inbound rule object for use in the public cloud computing environment for at least one of the virtual computing instances in the cloud network in the public cloud computing environment that has been determined to be part of a private native security group that corresponds to a private native firewall policy rule used in the private cloud computing environment; and
        updating at least one of the CNSG outbound rule object and the CNSG inbound rule object so that the private native firewall policy rule can be used in the cloud network for the at least one of the virtual computing instances in the cloud network in the public cloud computing environment.

2. The method of claim 1, further comprising, for a particular private native firewall policy rule with an action of deny, taking no action to create any CNSG rule object, wherein firewall policy rules for cloud native security groups (CNSGs) in the public cloud computing environment by default are set to deny.

3. The method of claim 1, wherein updating at least one of the CNSG outbound rule object and the CNSG inbound rule object includes updating the CNSG outbound rule object to indicate which cloud native security group (CNSG) needs to have an outbound rule that corresponds to the private native firewall policy rule.

4. The method of claim 1, further comprising updating the CNSG rule object to report an error when a number of existing CNSGs for the cloud network has reached a predefined limit.

5. The method of claim 1, further comprising creating a new CNSG in the cloud network that correspond to a source or destination PNSG in the private native firewall policy rules when there is no existing mapping between the source or destination PNSG and an existing CNSG.

6. The method of claim 1, wherein updating at least one of the CNSG outbound rule object and the CNSG inbound rule object includes: updating the CNSG outbound rule object to indicate which application security group to be used to create an outbound rule that correspond to the private native firewall policy rule, or updating the CNSG outbound rule object to indicate a virtual computing instance or a component of the virtual computing instance for one of the new PNSGs needs to be moved to the application security group.

7. The method of claim 1, further comprising executing routing actions on data traffic at the public cloud gateway in the cloud network in the public cloud computing environment based on populated CNSG rule objects, wherein the routing actions include denying and allowing for data traffic through the public cloud gateway in the cloud network based on the populated CNSG rule objects.

8. A non-transitory computer-readable storage medium containing program instructions for method for using private native security groups and private native firewall policy rules for a private cloud computing environment and a public cloud computing environment, wherein execution of the program instructions by one or more processors of a computer causes the one or more processors to perform steps comprising:
    creating a cloud network with virtual computing instances in the public cloud computing environment, the cloud network including a public cloud gateway for routing data traffic between at least the cloud network and the private cloud computing environment;
    creating new private native security groups (PNSGs) in response to user input; and
    for at least one of private native firewall policy rules that has any of the new private native security groups as one of source and destination:
        creating a cloud native security group (CNSG) rule object with an CNSG outbound rule object and an CNSG inbound rule object for use in the public cloud computing environment for at least one of the virtual computing instances in the cloud network in the public cloud computing environment that has been determined to be part of a private native security group that corresponds to a private native firewall policy rule used in the private cloud computing environment; and updating at least one of the CNSG outbound rule object and the CNSG inbound rule object so that the private native firewall policy rule can be used in the cloud network for the at least one of the virtual computing instances in the cloud network in the public cloud computing environment.

9. The computer-readable storage medium of claim 8, wherein the steps further comprise, for a particular private native firewall policy rule with an action of deny, taking no action to create any CNSG rule object, wherein firewall policy rules for cloud native security groups (CNSGs) in the public cloud computing environment by default are set to deny.

10. The computer-readable storage medium of claim 8, wherein updating at least one of the CNSG outbound rule object and the CNSG inbound rule object includes updating the CNSG outbound rule object to indicate which cloud native security group (CNSG) needs to have an outbound rule that corresponds to the private native firewall policy rule.

11. The computer-readable storage medium of claim 8, wherein the steps further comprise updating the CNSG rule object to report an error when a number of existing CNSGs for the cloud network has reached a predefined limit.

12. The computer-readable storage medium of claim 8, wherein the steps further comprise creating a new CNSG in the cloud network that correspond to a source or destination PNSG in the private native firewall policy rules when there is no existing mapping between the source or destination PNSG and an existing CNSG.

13. The computer-readable storage medium of claim 8, wherein updating at least one of the CNSG outbound rule object and the CNSG inbound rule object includes: updating the CNSG outbound rule object to indicate which application security group to be used to create an outbound rule that correspond to the private native firewall policy rule, or updating the CNSG outbound rule object to indicate a virtual computing instance or a component of the virtual computing instance for one of the new PNSGs needs to be moved to the application security group.

14. The computer-readable storage medium of claim 8, wherein the steps further comprise executing routing actions on data traffic at the public cloud gateway in the cloud network in the public cloud computing environment based on populated CNSG rule objects, wherein the routing actions include denying and allowing for data traffic through the public cloud gateway in the cloud network based on the populated CNSG rule objects.

15. A system for using private native security groups and private native firewall policy rules for a private cloud computing environment and a public cloud computing environment, the system comprising:

memory; and at least one processor configured to:

create a cloud network with virtual computing instances in the public cloud computing environment, the cloud network including a public cloud gateway for routing data traffic between at least the cloud network and the private cloud computing environment;

create new private native security groups (PNSGs) in response to user input; and for at least one of private native firewall policy rules that has any of the new private native security groups as one of source and destination:

create a cloud native security group (CNSG) rule object with an CNSG outbound rule object and an CNSG inbound rule object for use in the public cloud computing environment for at least one of the virtual computing instances in the cloud network in the public cloud computing environment that has been determined to be part of a private native security group that corresponds to a private native firewall policy rule used in the private cloud computing environment; and update at least one of the CNSG outbound rule object and the CNSG inbound rule object so that the private native firewall policy rule can be used in the cloud network for the at least one of the virtual computing instances in the cloud network in the public cloud computing environment.

16. The system of claim 15, wherein the at least one processor is configured to, for a particular private native firewall policy rule with an action of deny, take no action to create any CNSG rule object, wherein firewall policy rules for cloud native security groups (CNSGs) in the public cloud computing environment by default are set to deny.

17. The system of claim 15, wherein the at least one processor is configured to update the CNSG outbound rule object to indicate which cloud native security group (CNSG) needs to have an outbound rule that corresponds to the private native firewall policy rule.

18. The system of claim 15, wherein the at least one processor is configured to update the CNSG rule object to report an error when a number of existing CNSGs for the cloud network has reached a predefined limit.

19. The system of claim 15, wherein the at least one processor is configured to create a new CNSG in the cloud network that correspond to a source or destination PNSG in the private native firewall policy rules when there is no existing mapping between the source or destination PNSG and an existing CNSG.

20. The system of claim 15, wherein the at least one processor is configured to: update the CNSG outbound rule object to indicate which application security group to be used to create an outbound rule that correspond to the private native firewall policy rule, or update the CNSG outbound rule object to indicate a virtual computing instance or a component of the virtual computing instance for one of the new PNSGs needs to be moved to the application security group.

* * * * *